United States Patent [19]

Kuehn

[11] 3,929,929
[45] Dec. 30, 1975

[54] VINYL URETHANE RESINS
[75] Inventor: Erich Kuehn, Wilmington, Del.
[73] Assignee: ICI United States Inc., Wilmington, Del.
[22] Filed: May 29, 1973
[21] Appl. No.: 364,911

[52] U.S. Cl............... 260/859 R; 260/77.5 CR
[51] Int. Cl.² .................................. C08L 75/00
[58] Field of Search ............... 260/859, 77.5 CR

[56] References Cited
UNITED STATES PATENTS

| | | | |
|---|---|---|---|
| 3,297,745 | 1/1967 | Fekete | 260/77.5 AP |
| 3,371,056 | 2/1968 | Delius | 260/859 |
| 3,509,234 | 4/1970 | Burlant | 260/859 |
| 3,531,564 | 9/1970 | Schmidle | 260/859 |
| 3,553,174 | 1/1971 | Hausslein | 260/859 |
| 3,597,495 | 8/1971 | Sekmakas | 260/859 |
| 3,641,199 | 2/1972 | Niederhauser | 260/859 |
| 3,677,920 | 7/1972 | Kai | 260/859 |
| 3,678,014 | 7/1972 | Suzuki | 260/859 |
| 3,772,404 | 11/1973 | Knight | 260/859 R |
| 3,775,377 | 11/1973 | Kokawa | 260/859 |

FOREIGN PATENTS OR APPLICATIONS 2,120,399  11/1971  Germany ........................... 260/859

Primary Examiner—Paul Lieberman

[57] ABSTRACT

Improved vinyl urethane resins are disclosed. The resins are prepared by reacting a diol, a polyisocyanate, and a hydroxyl-terminated ester of acrylic or methacrylic acid wherein at least part of the excess functionality of the isocyanate is reduced by reaction with a diol.

15 Claims, No Drawings

VINYL URETHANE RESINS

BACKGROUND OF THE INVENTION

1. Field of the Invention

The present invention relates generally to improved vinyl urethane resins, to a method of preparing said resins, and to compositions containing said resins. More particularly, the invention relates to vinyl urethane resins comprising the reaction product of a diol, a polyisocyanate, and a hydroxy-terminated ester of acrylic or methacrylic acid wherein at least part of the excess functionality of the isocyanate is reduced by reaction with a diol.

2. Description of the Prior Art

Urethane resins prepared by reacting an isocyanate and an active hydrogen-containing compound are well known in the art. The active hydrogen-containing compounds employed may be any of a wide variety of materials, including both polyesters and polyethers. Vinyl urethane resins prepared by reacting an isocyanate, a polyol, and a hydroxyl-terminated ester of acrylic or methacrylic acid are also known in the art.

When an isocyanate having a functionality greater than about 2 -- i.e., containing more than 2 isocyanate (—NCO) groups per mol -- is utilized in the preparation of these resins, it is necessary to reduce the functionality of the isocyanate to 2.0 in addition to reacting it with the other components to prepare the desired resins. The reason for this requirement is that, if the resulting resin contains residual or unreacted isocyanate groups, the storage stability and/or solubility properties of the resin are generally adversely affected.

One previously available method for preparing resins of this type involves a three-step process wherein the functionality of the isocyanate is first reduced to 2.0 by reacting the isocyanate with a sufficient amount of the hydroxyl-terminated ester of acrylic or methacrylic acid to reduce the functionality to 2.0. The resulting product is then reacted with a hydroxyl-containing compound and the product obtained thereby is subsequently reacted with an additional amount of the hydroxyl-terminated ester of acrylic or methacrylic acid.

Since the vinyl urethane resins are frequently sold and utilized as solutions of the resin in a vinyl or allyl monomer, it is also well known that the resins can be prepared directly as a solution in a suitable monomer such as styrene. When prepared in accordance with the above-mentioned three-step procedure, the viscosity of the resin solution is generally high enough to be acceptable for most applications. However, the reaction times are longer than would be desired.

One method which has been suggested for overcoming the above-mentioned deficiencies is to first react the isocyanate with a sufficient amount of the hydroxyl-terminated ester to reduce the functionality of said isocyanate to 2.0 and to, subsequently, react the product obtained thereby with a mixture of the polyol and hydroxyl-terminated ester of acrylic or methacrylic acid. Although such a procedure reduces the reaction time required to prepare the vinyl urethane resins, the viscosity of solutions of said resins in vinyl or allyl monomers is also generally reduced. Although this lower viscosity does not significantly affect the properties of castings or coatings prepared from said solutions, the lower viscosity does result in practical problems making the resins unsuitable for many applications.

Similarly, attempts to prepare the vinyl urethane resins in one step wherein the isocyanate is added to a mixture of the diol and the hydroxyl-terminated ester of acrylic or methacrylic acid have been unsuccessful due, primarily, to the low viscosity of the resin solutions prepared in this manner.

It would, however, be desirable to prepare vinyl urethane resins from the above-mentioned reactants in a one- or two-step process, if the resins could be prepared in a manner such that the viscosity of solutions prepared therefrom would be comparable to those achieved with the above-mentioned three-step process.

SUMMARY OF THE INVENTION

In accordance with the present invention, vinyl urethane resins, the solution viscosity of which can be controlled over a wide range, are prepared. The resins are prepared from a diol, a polyisocyanate, and a hydroxyl-terminated ester of acrylic or methacrylic acid, wherein at least part of the excess functionality of the isocyanate is reduced by reaction with a diol.

The vinyl urethane resins are prepared either a. in a one-step process by combining an isocyanate with a mixture of a diol and a hydroxyl-terminated ester of acrylic or methacrylic acid, or b. in a two-step process wherein the isocyanate is first reacted with a diol or a mixture of a diol and a hydroxyl-terminated ester of acrylic or methacrylic acid in an amount sufficient to reduce the functionality of the isocyanate to about 2.0 and the resulting prepolymer is then reacted with a mixture of a diol and a hydroxyl-terminated ester of acrylic or methacrylic acid.

DESCRIPTION OF THE PREFERRED EMBODIMENTS

As mentioned above, in accordance with the present invention, vinyl urethane resins are prepared from:

a. a diol, b. a polyisocyanate, and c. a hydroxyl-terminated ester of acrylic or methacrylic acid.

To achieve the improved results of the present invention, it has been found critical to reduce at least part of the excess functionality of the isocyanate by reaction with a diol.

Each of the several components employed in the preparation of the resins of the present invention, the relative amounts of each component which may be utilized in the preparation of said resins, and the methods which may be employed for preparing said resins are described in detail below.

To assist in describing the invention so that it may be understood by those skilled in the art, but without wishing to be bound by any particular theory, the vinyl urethane resins prepared in accordance with the present invention may be represented by the following formula:

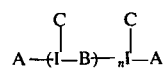

wherein

A is a radical derived from a hydroxyl-terminated ester of acrylic or methacrylic acid, B is a radical derived from a diol, I is a radical derived from a polyisocyanate, C is selected from the group consisting of B and mixtures of A and B wherein A and B are as defined above, and n is an integer equal to from 1 to about 5.

Diol

The diols which may be employed in preparing the vinyl urethane resins of the present invention include both aromatic and aliphatic compounds containing 2 hydroxyl groups.

Preferred diols are those prepared by reacting a dihydric alcohol with an alkylene oxide such as ethylene oxide or propylene oxide. These materials have the following general formula:

$$H(OA)_mO-\text{[phenyl]}(X)_b-(R)_a-\text{[phenyl]}(X)_b-O(AO)_nH$$

wherein

X is halogen or $C_1$-$C_3$ alkyl;

b is equal to from 0 to 4;

R is selected from the group consisting of alkylidene and cycloalkylidene radicals containing from 1 to about 6 carbon atoms, oxygen, sulfur and divalent radicals represented by the formulae:

$$\overset{|}{\underset{|}{C}}=O, \overset{|}{\underset{|}{S}}=O, \text{ or } O=\overset{|}{\underset{|}{S}}=O;$$

a is an integer equal to either 0 or 1;

A is an alkylene radical containing from 2 to 4 carbon atoms; and m and n are integers each of which is equal to at least 1 and the sum of which is equal to from at least 2 to about 16.

It has been found that, if R or A in the above-mentioned formula contains more than the indicated number of carbon atoms, the resulting resins are unsuitable for many applications due to the increased flexibility and lower heat distortion temperature of products prepared therefrom.

An especially preferred diol for use in preparing the resins of the present invention has the following general formula:

$$\text{HOCHCH}_2\text{O}-\text{[phenyl]}-\underset{\underset{CH_3}{|}}{\overset{\overset{CH_3}{|}}{C}}-\text{[phenyl]}-\text{OCH}_2\text{CHOH}$$
(with $CH_3$ groups on the HOCHCH$_2$O and OCH$_2$CHOH side chains)

Other diols may also be employed including, for example, the following:

HO-CH$_2$-CH$_2$-HN—[Cl$_4$-phenyl]—[Cl$_4$-phenyl]—NH-CH$_2$-CH$_2$-OH identified as bis(2-hydroxyethylamino)-octachlorobiphenyl;

$$\text{HOCH}_2-\underset{\underset{\underset{Br}{|}}{CH_2}}{\overset{\overset{\overset{Br}{|}}{CH_2}}{C}}-\text{CH}_2\text{OH}$$

identified as dibromoneopentyl glycol; and the diol identified as Firemaster PHT4-diol available from Michigan Chemical Corporation, Chicago, Illinois, having the following general formula:

[tetrabromocyclohexane ring with substituents: —COCH$_2$CH$_2$OCH$_2$CH$_2$OH and —COCH$_2$CHOH with CH$_3$]

Hydroxyl-Terminated Ester

The resins of the present invention also include a radical derived from a hydroxyl-terminated ester of acrylic or methacrylic acid. The preferred materials are the hydroxyalkyl esters having the following general formula:

$$CH_2=\underset{\underset{R}{|}}{C}-\overset{\overset{O}{\|}}{C}-OR_1OH$$

wherein $R_1$ is an alkyl group containing from 2 to about 4 carbon atoms and R is hydrogen or methyl. These materials are prepared by reacting acrylic acid or methacrylic acid with an alkylene oxide selected from the group consisting of ethylene oxide, propylene oxide, and butylene oxide. This reaction is carried out in accordance with methods which are well known in the art. Hydroxyalkyl esters which may be employed include, for example, hydroxyethyl acrylate, hydroxyethyl methacrylate, hydroxypropyl acrylate, hydroxypropyl methacrylate, hydroxybutyl acrylate and hydroxybutyl methacrylate.

Other hydroxyl-terminated esters which may be employed include, for example, those prepared by reacting one of the above-mentioned diols with acrylic or methacrylic acid. These materials are generally prepared by reacting the acid and diol in equimolar amounts resulting in an ester having the above formula wherein $R_1$ is derived from the diol. Representative of this type of ester are compounds having the above-mentioned formula wherein $R_1$ is, for example, $$-\underset{\underset{}{}}{CH}-CH_2O-\text{[phenyl]}-\underset{\underset{CH_3}{|}}{\overset{\overset{CH_3}{|}}{C}}-\text{[phenyl]}-OCH_2-\underset{\underset{}{}}{CH}-$$
(with $CH_3$ groups on the terminal CH positions)

or

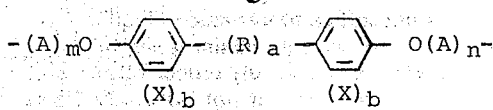

wherein R, a, b, A, m and n are as hereinabove defined.

Polyisocyanate

The polyisocyanates which may be employed in accordance with the present invention include any of those which have been utilized in the preparation of urethane and/or vinyl urethane resins. The only requirement is that the isocyanate have a functionality greater than 2. As used herein, the term "functionality" refers to the average number of isocyanate (NCO) groups per molecule. In accordance with the present invention, both aromatic and aliphatic isocyanates may be employed. While, for most applications, it is preferred to employ only one isocyanate in preparing a vinyl urethane resin, resins may also be prepared from a combination of two or more isocyanates. Representative isocyanates which may be employed in carrying out the present invention include, for example, those represented by the following formulas:

(a)
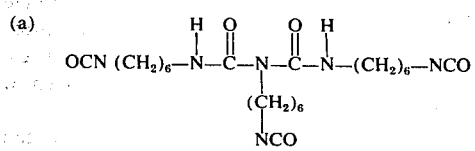

(b)
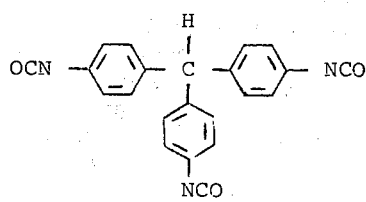

(c)
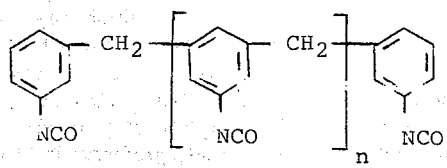

n = from about 0.1 to about 1.0

(d)
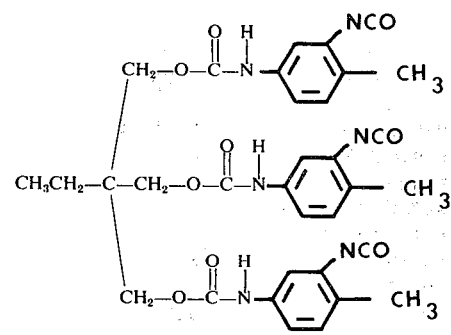

Compounds (a), (b), (c), and (d) are known, respectively, by the trade names Desmodur N, Mondur R, PAPI, and Mondur CB.

The amounts of the various components which are preferably employed in preparing the resins of the present invention may be described as follows:

The preferred resins of the present invention are those wherein there is employed up to one mol of diol. In this case, there should also be utilized about 2 mols of polyisocyanate and about 2 mols of the hydroxyl-terminated ester of acrylic or methacrylic acid per mol of diol. The following table illustrates these relationships:

TABLE 1

| Diol (mols) | Isocyanate (mols) | OH-Terminated Ester (mols) |
|---|---|---|
| 1 | 2 | 2 |
| 0.1 | 0.2 | 0.2 |
| 0.5 | 1 | 1 |

Alternatively, resins may be prepared wherein the amount of diol is equal to greater than 1 mol. In this case, the molar amount of isocyanate is equal to about 1 plus 1 mol per mol of diol and the amount of hydroxyl-terminated ester of acrylic or methacrylic acid is equal to about 2 mols. Thus, if the amount of diol is represented by $y$ where $y$ is an integer equal to at least 1.1, the amount of polyisocyanate which should be utilized is equal to about $y + 1$ mols and the amount of hydroxyl-terminated ester is equal to about 2 mols. These relationships are illustrated in the following table:

TABLE 2

| Diol (mols) | Isocyanate (mols) | OH-Terminated Ester (mols) |
|---|---|---|
| 1.5 | 2.5 | 2 |
| 2 | 3 | 2 |
| 3 | 4 | 2 |

As mentioned above, the isocyanates employed in the preparation of the resins of the present invention contain more than about 2.0 isocyanate groups per mol -- i.e., they have a functionality greater than about 2.0.

When such an isocyanate is employed, there results an excess of free isocyanate (NCO) groups in the resins. The free NCO functionality causes the products to be unstable. It is, therefore, necessary to react the excess isocyanate groups with a hydroxyl-containing compound. In this regard, it has been found in accordance with the present invention that this excess functionality should be reduced by reaction with one of the diols mentioned above. Although preferred results are achieved when only one diol is employed, mixtures of diols may be utilized in preparing the resins of the present invention.

The total excess NCO functionality present is determined as follows: f is the functionality of the isocyanate and is equal to $2.0 \times x$ where $x$ is an integer equal to from 0.1 to about 1.0. The total excess isocyanate groups are determined by multiplying $x$ times the number of mols of isocyanate employed in the preparation of the resin. Thus, if 2 mols of an isocyanate having a functionality of 2.6 are utilized to prepare the resin, the excess functionality is equal to $2 \times (0.6)$ or 1.2. In accordance with the present invention, it has been found that resins of any desired viscosity may be prepared if at least part of this excess functionality is reduced by being reacted with one of the previously described diols.

The actual amount of the excess functionality which is reduced by reaction with the diol depends upon the properties desired in the final product as well as the relative amount of each of the components employed in the preparation of said resins.

Preferred results are achieved when at least 50% of the excess functionality of the isocyanate is reduced by reaction with a diol. In this regard, it should be kept in mind that, since the diol contains 2 hydroxyl groups per mol, only half as much material is required as would be the case if a monohydroxyl compound, such as those employed in the prior art, was used to reduce this excess functionality.

Either less than or more than 50% of the excess functionality may be reduced by reaction with a diol. However, as the percentage of diol is reduced, the viscosity of the resulting resin solution also decreases; and, at very low percentages -- i.e., on the order of from 1 – 5% --, the increased viscosity is so low, when compared with a control wherein none of these diols are utilized to reduce the excess functionality of the isocyanate, as to not make a difference for most practical applications. However, in those instances where only a slight increase in solution viscosity is required, such small percentages of the excess functionality of the isocyanate may be reacted with a diol to achieve this result.

At amounts of diol sufficient to react with greater than about 50% of the excess functionality of the isocyanate, the solution viscosity of the resulting resins increases and may, in fact, increase to the point where the resin solutions become gel-like and difficult to work with. Such resins are also not preferred but, if desired for a certain application, they may be prepared in accordance with the present invention. This type of resin is generally prepared only where there is utilized more than about one mol of the diol as mentioned above -- i.e., where n in the above-mentioned formula is equal to greater than one and generally on the order of about 4 or 5.

When less than 100% of the excess functionality of the isocyanate is reacted with a diol, there must also be utilized an additional hydroxyl-containing compound in an amount sufficient to introduce adequate hydroxyl groups to react with any remaining isocyanate -- i.e., NCO-functionality. While any monohydroxyl-containing compound, which does not adversely affect the formation of the desired resin or the properties of the resulting vinyl urethane resin, may be employed for this purpose, preferred results are achieved when an additional amount of a hydroxyl-terminated ester of acrylic or methacrylic acid as defined above is utilized for this purpose. Preferred results are achieved when the excess functionality is reduced with a mixture of

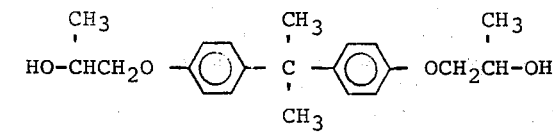

and

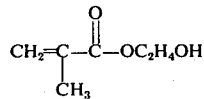

wherein at least 50% of the hydroxyl groups in said mixture are derived from the first of said compounds.

As was also mentioned above, the resins of the present invention may be prepared in either a two-step or one-step process.

In the two-step process, the isocyanate is first reacted with a diol or a mixture of a diol and a second hydroxyl-containing compound as defined above to reduce the functionality of the isocyanate to 2.0. The resulting material which has an isocyanate functionality equal to 2.0 is combined with a mixture of a diol and a hydroxyl-terminated ester of acrylic acid of the type and in the amounts described above.

Alternatively, in the preferred process of the present invention, the functionality of the isocyanate is reduced and the resin is prepared simultaneously by adding the polyisocyanate to a mixture of a diol and a hydroxyl-terminated ester of acrylic or methacrylic acid. The amounts of diol and ester in said reaction mixture are calculated to be sufficient to a. react with the isocyanate to form the desired vinyl urethane resin, and b. reduce the excess functionality of the isocyanate. Thus, for example:

2 mols of an isocyanate having a functionality equal to 2.6 are added to a mixture of a. 1 mol of a diol (to form resin) and 0.3 mol of a diol (to reduce 50% of excess functionality or a total of 1.3 mols of diol, and b. 2 mols of a hydroxyl-terminated ester of acrylic or methacrylic acid (to form resin) and 0.6 mol of an ester (to reduce 50% of excess functionality) or a total of 2.6 mols of a hydroxyl-terminated ester of acrylic or methacrylic acid.

The preparation of the resin is carried out in the presence of a suitable solvent such as a vinyl or allyl monomer. Representative solvents which may be employed include, for example, styrene, t-butyl styrene, α-methyl styrene, chlorostyrene, divinyl benzene, acrylic acid, dimethyl maleate, dibutyl fumarate, butyl methacrylate, nonyl methacrylate, allyl alcohol, and the like. Of these, it is especially preferred to employ styrene resulting in the preparation of a styrene solution of the vinyl urethane resins which may be utilized directly for a variety of applications. The amount of solvent may be varied depending upon the use to be made of the resulting resin solution.

The resin solution may contain any of the additives which are conventionally employed in such materials. To improve the storage stability of the solution, from about 0.01 to about 0.2 percent of a polymerization inhibitor such as tertiary butyl catechol or hydroquinone may be employed. Other additives which may also be employed include, for example, antioxidants, UV absorbers, dyes, pigments, and catalysts.

The resins of the present invention have been found to be particularly useful in applications such as castings, coatings, and laminates where it is desirable to have improved physical properties such as high tensile strength, elongation and hardness. They are useful in a variety of filament-wound products such as pipes, ducts, and storage tanks and in molded products where they may be combined with fillers and fibers.

As mentioned above, a significant advantage of the resins of the present invention is the increased viscosity of solutions thereof. This increased viscosity is particularly noticeable when compared with the viscosity of similar resins wherein the excess functionality of the isocyanate is reduced by reaction with a compound other than one of the diols which are utilized for that purpose in accordance with the present invention.

In order to describe the present invention so that it may be more clearly understood, the following examples are set forth. These examples are set forth primarily for the purpose of illustration and any enumeration of detail contained therein should not be interpreted as a limitation on the concept of the present invention.

In order to more conveniently describe the reactants employed in the examples, the reactants are identified by their trademarks or a representative symbol. The trademarks or symbols used in the examples are identified as follows:

Mondur MR refers to a polymethylene polyphenyl isocyanate having a functionality of 2.6 and a molecular weight of 343 available from Mobay Chemical Company.

Isonate 580 refers to a polyisocyanate having a functionality of 2.9 and a molecular weight of 406 available from The Upjohn Company.

Isonate 143L refers to a polyisocyanate having a functionality of 2.1 and a molecular weight of 295 available from The Upjohn Company.

Diol A refers to 2.2 prodendro bisphenol A. This material is prepared by reacting 2.2 mols of propylene oxide with 1 mol of bisphenol A and has a molecular weight of 358.

Diol B refers to 2.2 prodendro 4,4' butylidene bis(6-tert-butyl-m-cresol). This material has a molecular weight of 501, is prepared by reacting 2.2 mols of propylene oxide with 1 mol of 4,4' butylidene bis(6-tert-butyl-m-cresol), and has the following structure:

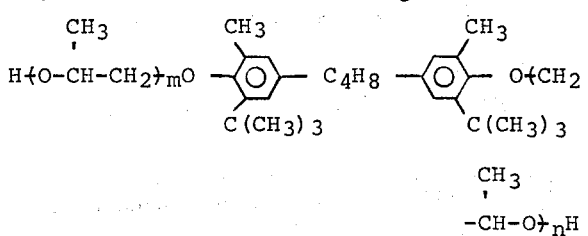

wherein the sum of $m$ and $n$ is equal to 2.2.

Diol C refers to 2.1 prodendro 4,4' thiodiphenol. This material has a molecular weight of 353, is prepared by reacting 2.1 mols of propylene oxide with 1 mol of 4,4' thiodiphenol, and has the following structure:

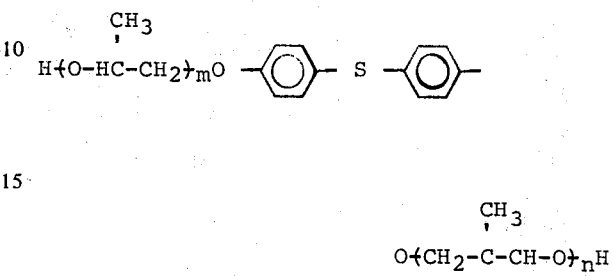

wherein the sum of $m$ and $n$ is equal to 2.1.

HEMA refers to hydroxyethyl methacrylate having a purity equal to 96% by weight.

Also, in the examples, the following strandard procedures and tests were employed:

Castings were prepared by pouring the resin composition into a mold comprising 2 glass plates, each of which had previously been coated with a mold release agent, spaced 1/8 inch apart, and sealed together on 3 edges. After the composition was poured into the mold, the fourth edge was sealed and the composition was allowed to cure at room temperature for 24 hours. At the end of this time, the material was post-cured by placing the mold in an oven at 100°C. for 4 hours. After cooling, the glass plates were separated and the solid casting was removed and tested.

Tensile strength was measured in accordance with A.S.T.M. Standard D-638-71a.

Flexural strength was measured in accordance with A.S.T.M. Standard D-790-71.

Elongation was measured in accordance with A.S.T.M. Standard D-638-71a.

Heat distortion temperature (HDT) was measured in accordance with A.S.T.M. Standard D-648-72.

Charpy impact was determined in accordance with A.S.T.M. Standard D-256.

Barcol hardness was measured in accordance with A.S.T.M. Standard D-2583-67.

Percent free NCO was measured in accordance with the procedure described in Union Carbide Bulletin F-41146 entitled "Urethane Coatings Chemicals" at page 24.

Viscosity was measured at room temperature on a Brookfield Viscometer, Model LVF.

EXAMPLE 1

A vinyl urethane resin was prepared comprising:

| Mondur MR | 6.63 mols | 2,275 grams |
| Diol A | 5.30 mols | 1,862.5 grams |
| HEMA | 6.92 mols | 900 grams |

The following procedure was employed:

Into a 12-liter, 4-neck flask equipped with a stirrer, nitrogen inlet tube, thermometer, dropping funnel, and condenser, there was added a solution comprising:
1,862.5 grams of Diol A, 900 grams of HEMA,
2,262.5 grams of styrene, and
0.4 gram of dibutyl tin dilaurate.

The solution was heated to 60°C. and there was then added dropwise a solution comprising:
2,275 grams of Mondur MR,
2,275 grams of styrene, and
0.4 gram of dibutyl tin dilaurate.

This solution was added at a rate such that the temperature of the reaction mixture did not exceed 70°C. When the addition was complete, an additional 425 grams of styrene were added to remove any residual isocyanate from the dropping funnel. The temperature of the resulting reaction mixture was maintained at from 60°C. to 70°C. until the percent free NCO was below 0.5%. At this time, there was added 5 grams of tertiary butyl catechol and the resin was cooled. The resulting resin solution had a viscosity of 2,290 centipoise.

A composition was prepared comprising:
300 grams of the resin solution prepared above,
4.5 grams of a 60% solution of methyl ethyl ketone peroxide in dimethyl phthalate, and
2.4 grams of cobalt naphthenate containing 6% by weight cobalt.

Castings prepared from this composition had the following physical properties:

| | |
|---|---|
| Tensile strength (psi) | 11,000 |
| Flexural strength (psi) | 22,200 |
| Barcol hardness | 40–42 |
| HDT (°C.) | 100.5 |
| Charpy impact | 7.46 |
| Elongation (%) | 2.55 |

EXAMPLE 2

A vinyl urethane resin was prepared comprising:

| | | |
|---|---|---|
| Mondur MR | 6.77 mols | 2,320 grams |
| Diol A | 4.38 mols | 1,540 grams |
| HEMA | 9.16 mols | 1,190 grams |

The following procedure was employed:
Into a reaction flask as described in Example 1, there was added a solution comprising:
1,540 grams of Diol A,
1,190 grams of HEMA,
2,040 grams of styrene, and
0.4 gram of dibutyl tin dilaurate.

The solution was heated to 60°C. and there was then added dropwise a solution comprising:
2,320 grams of Mondur MR,
2,320 grams of styrene, and
0.4 gram of dibutyl tin dilaurate.

This solution was added at a rate such that the temperature of the reaction mixture did not exceed 70°C. When the addition was complete, an additional 590 grams of styrene were added to remove any residual isocyanate from the dropping funnel. The temperature of the resulting reaction mixture was maintained at from 60°C. to 70°C. until the percent free NCO was below 0.5%. At this time, there was added 5 grams of tertiary butyl catechol and the resin was cooled. The resulting resin solution had a viscosity of 500–600 centipoise.

A composition was prepared comprising:
300 grams of the resin solution prepared above,
4.5 grams of a 60% solution of methyl ethyl ketone peroxide in dimethyl phthalate, and
2.4 grams of cobalt naphthenate containing 6% by weight cobalt.

Castings prepared from this composition had the following physical properties:

| | |
|---|---|
| Tensile strength | 11,800 |
| Flexural strength | 19,900 |
| Barcol hardness | 41–43 |
| HDT (°C.) | 107 |
| Charpy impact | 7.30 |
| Elongation (%) | 2.74 |

EXAMPLE 3

A vinyl urethane resin was prepared comprising:

| | | |
|---|---|---|
| Mondur MR | 1.83 mols | 628 grams |
| Diol A | 1.13 mols | 398 grams |
| HEMA | 2.60 mols | 338 grams |

The following procedure was employed:
Into a reaction flask as described in Example 1, there was added a solution comprising:
398 grams of Diol A,
338 grams of HEMA,
700 grams of styrene,
1.35 grams of tertiary butyl catechol, and
0.4 gram of dibutyl tin dilaurate.

The solution was heated to 60°C. and there was then added dropwise a solution comprising:
628 grams of Mondur MR,
400 grams of styrene, and
0.4 gram of dibutyl tin dilaurate.

This solution was added at a rate such that the temperature of the reaction mixture did not exceed 70°C. When the addition was complete, an additional 326 grams of styrene were added to remove any residual isocyanate from the dropping funnel. The temperature of the resulting reaction mixture was maintained at from 60°C. to 70°C. until the percent free NCO was below 0.5%. At this time, there was added 5 grams of tertiary butyl catechol and the resin was cooled. The resulting resin solution had a viscosity of 340 centipoise.

A composition was prepared comprising:
300 grams of the resin solution prepared above,
4.5 grams of a 60% solution of methyl ethyl ketone peroxide in dimethyl phthalate, and
2.4 grams of cobalt naphthenate containing 6% by weight cobalt.

Castings prepared from this composition had the following physical properties:

| | |
|---|---|
| Tensile strength (psi) | 10,900 |
| Flexural strength (psi) | 21,100 |
| Barcol hardness | 40–41 |
| HDT (°C.) | 108 |
| Charpy impact | 7.30 |
| Elongation (%) | 2.47 |

EXAMPLE 4

A vinyl urethane resin was prepared comprising:

| | | |
|---|---|---|
| Mondur MR | 0.47 mols | 161 grams |
| Diol A | 0.31 mols | 109.2 grams |
| HEMA | 0.64 mols | 83.3 grams |

The following procedure was employed:
Into a reaction flask as described in Example 1, there was added a solution comprising:

25.2 grams of Diol A,
19.6 grams of HEMA,
50 grams of styrene, and
0.16 gram of dibutyl tin dilaurate.

The solution was heated to 65°C. and there was then added dropwise a solution comprising:

161 grams of Mondur MR, and
100 grams of styrene.

This solution was added at a rate such that the temperature of the reaction mixture did not exceed 70°C. When the addition was complete, an additional 61 grams of styrene were added to remove any residual isocyanate from the dropping funnel. The temperature of the resulting reaction mixture was maintained at 70°C. for 1 hour at the end of which time there was added a solution comprising:

84.0 grams of Diol A,
63.7 grams of HEMA, and
110 grams of styrene.

This solution was added dropwise over a period of 30 minutes. When the addition was complete, an additional 25.5 grams of styrene were added to remove any residual material from the dropping funnel. The temperature of the resulting reaction mixture was maintained at 75°C. until the percent free NCO was below 0.5%. At this time, there was added 0.35 gram of tertiary butyl catechol and the resin was cooled. The resulting resin solution had a viscosity of 500 centipoise.

A composition was prepared comprising:
300 grams of the resin solution prepared above,
4.5 grams of a 60% solution of methyl ethyl ketone peroxide in dimethyl phthalate, and
2.4 grams of cobalt naphthenate containing 6% by weight cobalt.

Castings prepared from this composition had the following physical properties:

| | |
|---|---|
| Tensile strength (psi) | 10,400 |
| Flexural strength (psi) | 21,100 |
| Barcol hardness | 39–41 |
| HDT (°C.) | 101 |
| Charpy impact | 7.18 |
| Elongation (%) | 2.55 |

EXAMPLE 5

A vinyl urethane resin was prepared comprising:

| | | |
|---|---|---|
| Mondur MR | 0.53 mols | 180.8 grams |
| Diol A | 0.42 mols | 150.8 grams |
| HEMA | 0.55 mols | 71.2 grams |

The following procedure was employed:
Into a reaction flask as described in Example 1, there was added a solution comprising:

150.8 grams of Diol A,
71.2 grams of HEMA,
200 grams of styrene,
0.4 gram of tertiary butyl catechol, and
0.2 gram of dibutyl tin dilaurate.

The solution was heated to 60°C. and there was then added dropwise a solution comprising:

180.8 grams of Mondur MR, and
100 grams of styrene.

This solution was added at a rate such that the temperature of the reaction mixture did not exceed 75°C. When the addition was complete, an additional 97.2 grams of styrene were added to remove any residual isocyanate from the dropping funnel. The temperature of the resulting reaction mixture was maintained at from 70°C. to 75°C. until the percent free NCO was below 0.5%. At this time, the resin solution was cooled. The resulting resin solution had a viscosity of 880 centipoise.

A composition was prepared comprising:
300 grams of the resin solution prepared above,
4.5 grams of a 60% solution of methyl ethyl ketone peroxide in dimethyl phthalate, and
2.4 grams of cobalt naphthenate containing 6% by weight cobalt.

Castings prepared from this composition had the following physical properties:

| | |
|---|---|
| Tensile strength (psi) | 11,500 |
| Flexural strength (psi) | 22,700 |
| Barcol hardness | 38–40 |
| HDT (°C.) | 97 |
| Charpy impact | 8.40 |
| Elongation (%) | 3.06 |

EXAMPLE 6

A vinyl urethane resin was prepared comprising:

| | | |
|---|---|---|
| Mondur MR | 0.52 mols | 177.2 grams |
| Diol A | 0.49 mols | 176 grams |
| HEMA | 0.37 mols | 48.8 grams |

The following procedure was employed:
Into a reaction flask as described in Example 1, there was added a solution comprising:

176 grams of Diol A,
48.8 grams of HEMA,
200 grams of styrene,
0.4 gram of tertiary butyl catechol, and
0.2 gram of dibutyl tin dilaurate.

The solution was heated to 60°C. and there was then added dropwise a solution comprising:

177.2 grams of Mondur MR, and
150 grams of styrene.

This solution was added at a rate such that the temperature of the reaction mixture did not exceed 75°C. When the addition was complete, an additional 48 grams of styrene were added to remove any residual isocyanate from the dropping funnel. The temperature of the resulting reaction mixture was maintained at from 70°C. to 75°C. until the percent free NCO was 0.7%. At this time, the resin solution was cooled. The resulting resin solution has a viscosity of 1,800 centipoise.

A composition was prepared comprising:
300 grams of the resin solution prepared above,
5.0 grams of a 60% solution of methyl ethyl ketone peroxide in dimethyl phthalate, and
2.8 grams of cobalt naphthenate containing 6% by weight cobalt.

Castings prepared from this composition had the following physical properties:

| | |
|---|---|
| Tensile strength (psi) | 11,600 |
| Flexural strength (psi) | 20,700 |
| Barcol hardness | 37–38 |
| HDT (°C.) | 92 |
| Charpy impact | 8.87 |
| Elongation (%) | 3.20 |

EXAMPLE 7

A vinyl urethane resin is prepared comprising:

| Isonate 580 | 1.06 mols | 430 grams |
| Diol B | 0.72 mols | 360 grams |
| HEMA | 1.68 mols | 219 grams |

The following procedure is employed:
Into a reaction flask as described in Example 1, there is added a solution comprising:
  360 grams of Diol B,
  219 grams of HEMA,
  500 grams of styrene,
  1.0 gram of t-butyl catechol, and
  0.3 gram of dibutyl tin dilaurate.
The solution is heated to 65°C. and there is then added dropwise a solution comprising:
  430 grams of Isonate 580, and
  400 grams of styrene.
This solution is added at a rate such that the temperature of the reaction mixture did not exceed 75°C. When the addition is complete, an additional 91 grams of styrene is added to remove any residual isocyanate from the dropping funnel. The temperature of the resulting reaction mixture is maintained at from 70°C. to 75°C. until the percent free NCO is below 0.5%. The resin solution is then cooled. The viscosity of the solution is higher than that of an identical resin wherein the excess functionality of the isocyanate is reacted completely with HEMA.

EXAMPLE 8

A vinyl urethane resin is prepared comprising:

| Isonate 143L | 1.62 mols | 478 grams |
| Diol C | 0.85 mols | 300 grams |
| HEMA | 1.78 mols | 231 grams |

The following procedure was employed:
Into a reaction flask as described in Example 1, there is added a solution comprising:
  300 grams of Diol C,
  231 grams of HEMA,
  500 grams of styrene,
  1.0 gram of t-butyl catechol, and
  0.3 gram of dibutyl tin dilaurate.
The solution is heated to 65°C. and there is then added dropwise a solution comprising:
  478 grams of Isonate 143L, and
  400 grams of styrene.
This solution is added at a rate such that the temperature of the reaction mixture did not exceed 75°C. When the addition is complete, an additional 91 grams of styrene is added to remove any residual isocyanate from the dropping funnel. The temperature of the resulting reaction mixture is maintained at from 70°C. to 75°C. until the percent free NCO is below 0.5%. The resin solution is then cooled. The viscosity of the resulting resin solution is higher than that of an identical resin wherein the excess functionality of the isocyanate is reacted completely with HEMA.

What is claimed is:
1. A composition comprising:
  a. a vinyl urethane resin comprising the reaction product of a diol, a polyisocyanate having a functionality equal to from 2.1 to about 3.0, and a hydroxyl terminated ester of acrylic or methacrylic acid; provided that, (i) when the amount of the diol is equal to up to 1 mole, the amount of the polyisocyanate is equal to about 2 moles per mole of the diol and the amount of hydroxyl terminated ester is equal to about 2 moles per mole of the diol, (ii) when the amount of the diol is equal to greater than 1 mole, the amount of the polyisocyanate is equal to about 1 mole plus 1 mole per mole of the diol and the amount of the hydroxyl terminated ester is equal to about 2 moles, and (iii) at least 50 percent of the excess functionality of the polyisocyanate is reduced by reaction with the diol, and, when less than 100 percent of the excess functionality of the polyisocyanate is reacted with the diol, an additional hydroxylcontaining compound is employed in an amount sufficient to introduce adequate hydroxyl groups to react with any remaining isocyanate functionality; and
  b. a monomer selected from the group consisting of styrene, t-butyl styrene, alpha methyl styrene, chlorostyrene, divinyl benzene, acrylic acid, dimethyl maleate, dibutyl fumarate, butyl methacrylate, and nonyl methacrylate.

2. A composition, as claimed in claim 1, wherein the diol has the following formula:

$$H(OA)_mO - \underset{(X)_b}{\bigcirc} - (R)_a - \underset{(X)_b}{\bigcirc} - O(AO)_nH$$

wherein
  X is halogen or $C_1$-$C_3$ alkyl;
  b is equal to from 0 to 4;
  R is selected from the group consisting of alkylidene and cycloalkylidene radicals containing from 1 to about 6 carbon atoms, oxygen, sulfur and divalent radicals represented by the formulae:

$$\overset{|}{\underset{|}{C}}=O, \ \overset{|}{\underset{|}{S}}=O, \ or \ O=\overset{|}{\underset{|}{S}}=O;$$

a is an integer equal to either 0 or 1;
  A is an alkylene radical containing from 2 to 4 carbon atoms; and
  m and n are integers each of which is equal to at least 1 and the sum of which is equal to from at least 2 to about 16.

3. A composition, as claimed in claim 1, wherein the diol has the following formula:

$$HOCHCH_2O - \underset{CH_3}{\bigcirc} - \underset{\underset{CH_3}{|}}{\overset{CH_3}{\underset{|}{C}}} - \underset{CH_3}{\bigcirc} - OCH_2CHOH$$

4. A composition, as claimed in claim 1, wherein the hydroxyl-terminated ester of acrylic or methacrylic acid has the following formula:

$$CH_2=C-\overset{O}{\underset{R}{\overset{\|}{C}}}-OR_1OH$$

wherein $R_1$ is an alkyl group containing from 2 to about 4 carbon atoms and R is hydrogen or methyl.

5. A composition, as claimed in claim 1, wherein the hydroxyl-terminated ester of acrylic or methacrylic acid is hydroxyethyl methacrylate.

6. A composition, as claimed in claim 1, wherein the polyisocyanate has the following formula:

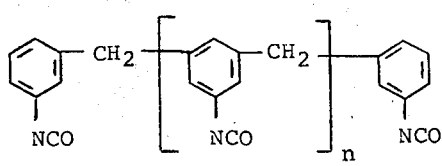

wherein $n$ is an integer equal to from about 0.1 to about 1.0.

7. A composition, as claimed in claim 1, wherein the excess functionality of the isocyanate is reacted with a mixture of a diol and a hydroxyl-terminated ester of acrylic or methacrylic acid, wherein at least 50% of the hydroxyl groups in said mixture are derived from the diol.

8. A composition, as claimed in claim 7, wherein the diol in said mixture has the following formula:

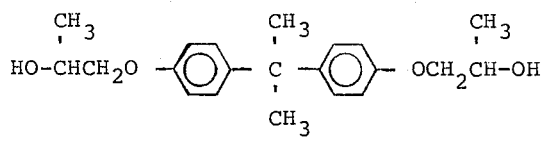

and the hydroxyl-terminated ester in said mixture has the following formula:

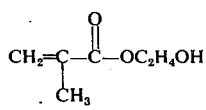

9. A composition, as claimed in claim 1, wherein the vinyl urethane resin comprises the reaction product of $x$ moles of the diol, $2x$ moles of the polyisocyanate, and $2x$ moles of the hydroxyl terminated ester of acrylic or methacrylic acid, wherein $x$ is equal to up to about 1.0.

10. A composition, as claimed in claim 1, wherein the vinyl urethane resin comprises the reaction product of
 $y$ moles of the diol,
 $y + 1$ mole of the polyisocyanate, and
 2 moles of the hydroxyl terminated ester of acrylic or methacrylic acid, wherein $y$ is equal to at least 1.1.

11. A method of preparing a solution of a vinyl urethane resin, said method comprising:
 a. preparing a prepolymer by reacting, in a vinyl or allyl monomer solvent selected from the group consisting of styrene, t-butyl styrene, alpha methyl styrene, chlorostyrene, divinyl benzene, acrylic acid, dimethyl maleate, dibutyl fumarate, butyl methacrylate, and nonyl methacrylate, a polyisocyanate having a functionality equal to from 2.1 to about 3.0 with a diol or a mixture of a diol and a monohydroxyl compound wherein at least 50 percent of the hydroxyl groups are derived from the diol, the amount of the diol or mixture of diol and monohydroxyl compound being sufficient to reduce the functionality of the polyisocyanate to about 2.0; and
 b. reacting said prepolymer in a single step with a mixture of a diol and a hydroxyl terminated ester of acrylic or methacrylic acid; provided that (i) when the amount of the diol is equal to up to 1 mole the amount of the prepolymer is equal to about 2 moles per mole of the diol and the amount of the hydroxyl terminated ester is equal to about 2 moles per mole of the diol, and (ii) when the amount of the diol is equal to greater than 1 mole, the amount of the prepolymer is equal to about 1 mole plus 1 mole per mole of the diol and the amount of the hydroxyl terminated ester is equal to about 2 moles.

12. A method, as claimed in claim 11, wherein the solvent is styrene.

13. A method of preparing a solution of a vinyl urethane resin, said method comprising reacting, in one step and in a vinyl or allyl monomer solvent, selected from the group consisting of styrene, t-butyl styrene, alpha methyl styrene, chlorostyrene, divinyl benzene, acrylic acid, dimethyl maleate, dibutyl fumarate, butyl methacrylate, and nonyl methacrylate, a diol, a hydroxyl terminated ester of acrylic or methacrylic acid, and a polyisocyanate having a functionality equal to from 2.1 to about 3.0; provided that (i) when the amount of the diol is equal to up to 1 mole, the amount of the polyisocyanate is equal to about 2 moles per mole of the diol and the amount of the hydroxyl terminated ester is equal to about 2 moles per mole of the diol, and (ii) when the amount of the diol is equal to greater than 1 mole, the amount of the polyisocyanate is equal to about 1 mole plus 1 mole per mole of the diol and the amount of the hydroxyl terminated ester is equal to about 2 moles, and (iii) there is also included an additional amount of diol sufficient to react with at least 50 percent of the excess functionality of the polyisocyanate and, when less than 100 percent of the excess functionality of the polyisocyanate is reacted with the diol an additional hydroxyl-containing compound is employed in an amount sufficient to introduce adequate hydroxyl groups to react with any remaining isocyanate functionality.

14. A method, as claimed in claim 13, wherein the solvent is styrene.

15. A composition, as claimed in claim 1, wherein the monomer is styrene.

* * * * *

UNITED STATES PATENT AND TRADEMARK OFFICE
CERTIFICATE OF CORRECTION

PATENT NO. : 3,929,929
DATED      : December 30, 1975
INVENTOR(S): Erich Kuehn

It is certified that error appears in the above-identified patent and that said Letters Patent are hereby corrected as shown below:

Column 1, line 11, "hydroxy-terminated" should read -- hydroxyl-terminated --.
Column 6, line 52, "y + (the letter l)" should read -- y + (the number 1) --.
Column 12, line 35, "326" should read -- 236 --.
Column 16, line 12, "hydroxylcontaining" should read -- hydroxyl-containing --.

Signed and Sealed this

Eighth Day of May 1979

[SEAL]

Attest:

RUTH C. MASON
Attesting Officer

DONALD W. BANNER
Commissioner of Patents and Trademarks